(12) United States Patent
Ueda et al.

(10) Patent No.: US 9,046,445 B2
(45) Date of Patent: Jun. 2, 2015

(54) RIM ASSEMBLY, TIRE TESTING MACHINE, AND RIM ASSEMBLY REPLACEMENT METHOD

(71) Applicants: Tatsuya Ueda, Hiroshima (JP); Makoto Tachibana, Hiroshima (JP)

(72) Inventors: Tatsuya Ueda, Hiroshima (JP); Makoto Tachibana, Hiroshima (JP)

(73) Assignee: MITSUBISHI HEAVY INDUSTIES MACHINERY TECHNOLOGY CORPORATION, Hiroshima-shi, Hiroshima (JP)

( * ) Notice: Subject to any disclaimer, the term of this patent is extended or adjusted under 35 U.S.C. 154(b) by 0 days.

(21) Appl. No.: 14/007,838

(22) PCT Filed: Oct. 12, 2012

(86) PCT No.: PCT/JP2012/076550
§ 371 (c)(1),
(2) Date: Sep. 26, 2013

(87) PCT Pub. No.: WO2013/069407
PCT Pub. Date: May 16, 2013

(65) Prior Publication Data
US 2014/0069180 A1    Mar. 13, 2014

(30) Foreign Application Priority Data

Nov. 11, 2011    (JP) ................................ 2011-247823

(51) Int. Cl.
*G01M 17/02*    (2006.01)
*B60C 25/00*    (2006.01)
*B29D 30/06*    (2006.01)

(52) U.S. Cl.
CPC ........... *G01M 17/021* (2013.01); *B60C 25/002* (2013.04); *B29D 2030/0634* (2013.01)

(58) Field of Classification Search
USPC ................................................. 73/146–146.8
See application file for complete search history.

(56) References Cited

U.S. PATENT DOCUMENTS

| | | | |
|---|---|---|---|
| 3,043,130 A | 7/1962 | Patterson | |
| 4,763,710 A | 8/1988 | Pielach | |
| 4,971,128 A | 11/1990 | Koga et al. | |

(Continued)

FOREIGN PATENT DOCUMENTS

| | | |
|---|---|---|
| JP | S63-232009 A | 9/1988 |
| JP | H01-192532 A | 8/1989 |

(Continued)

OTHER PUBLICATIONS

PCT/ISA/210, "International Search Report for PCT/JP2012/076550", Dec. 25, 2012.

(Continued)

*Primary Examiner* — Andre Allen
(74) *Attorney, Agent, or Firm* — Benjamin Hauptman; Manabu Kanesaka; Kenneth Berner

(57) ABSTRACT

To provide a rim assembly to which even a small tire can be mounted, a tire testing machine, and a rim assembly replacement method. The rim assembly having an upper rim and a lower rim in a pair to which a tire to be tested is mounted, includes: a pin provided on the lower rim; a pin receiving portion that is provided on the upper rim and engageable with the pin; and a groove portion having a recessed groove with a recessed section that can house at least a part of a tip of the pin, formed in a surface of the upper rim on a side of the lower rim.

8 Claims, 21 Drawing Sheets

(56) References Cited

U.S. PATENT DOCUMENTS

| | | | | |
|---|---|---|---|---|
| 5,992,227 A | * | 11/1999 | Jellison et al. | 73/146 |
| 6,089,084 A | * | 7/2000 | Nishihara et al. | 73/146 |
| 6,244,105 B1 | * | 6/2001 | Nishihara et al. | 73/146 |
| 2013/0233067 A1 | | 9/2013 | Wollbrinck et al. | |
| 2014/0060181 A1 | * | 3/2014 | Tachibana et al. | 73/460 |

FOREIGN PATENT DOCUMENTS

| | | |
|---|---|---|
| JP | H03-47742 A | 2/1991 |
| JP | H03-110138 A | 5/1991 |
| JP | H03-231834 A | 10/1991 |
| JP | 09-070833 A | 3/1997 |
| JP | 2661753 B2 | 10/1997 |
| JP | H10-160643 A | 6/1998 |
| JP | 3672135 B2 | 7/2005 |
| JP | 2006-051791 A | 2/2006 |
| JP | 2010-151492 A | 7/2010 |
| JP | 2011-025425 A | 2/2011 |
| JP | 2011-042185 A | 3/2011 |
| JP | 2011-174839 A | 9/2011 |

OTHER PUBLICATIONS

PCT/ISA/237, "Written Opinion of the International Searching Authority for PCT/JP2012/076550", Dec. 25, 2012.

Korea Patent Office, "Notice of Allowance for KR 10-2013-7024887," Nov. 20, 2014.

German Patent Office, "Office Action for DE 112012004720.6," Feb. 25, 2015.

* cited by examiner

RIM ASSEMBLY, TIRE TESTING MACHINE, AND RIM ASSEMBLY REPLACEMENT METHOD

RELATED APPLICATIONS

The present application is National Phase of International Application No. PCT/JP2012/076550 filed Oct. 12, 2012, and claims priority from, Japanese Application No. 2011-247823, filed Nov. 11, 2011.

TECHNICAL FIELD

The present invention relates to a rim assembly to which a tire as an object to be tested is mounted, a tire testing machine, and a rim assembly replacement method.

BACKGROUND ART

Tire testing machines include a tire uniformity measurement machine that measures uniformity of a tire, and a tire balance measurement device that measures balance of a tire. In measurement by a tire testing machine, a testing rim to which a tire to be tested is mounted is replaced for each type of tire depending on its bead diameter or bead width.

In order to address a case where many types of tires are to be measured, a method for automatically replacing a testing rim has been proposed to reduce replacement time of the testing rim and save labor in the replacement operation. PTLs 1 to 5 disclose inventions relating to a rim replacement device.

CITATION LIST

Patent Literature

{PTL 1}
Japanese Patent No. 2661753
{PTL 2}
Japanese Unexamined Patent Application, Publication No. H3-110138
{PTL 3}
Japanese Unexamined Patent Application, Publication No. H3-47742
{PTL 4}
Japanese Unexamined Patent Application, Publication No. H3-231834
{PTL 5}
Japanese Patent No. 3672135

SUMMARY OF INVENTION

Technical Problem

A testing rim includes a pair of an upper rim and a lower rim to facilitate mounting and removal of a tire. When the tire is mounted to the upper rim and the lower rim and tested, the upper rim and the lower rim are each mounted to a tire testing machine and separated from each other.

When the upper rim and the lower rim are replaced by a rim replacement device, in many cases, the upper rim is integrated with the lower rim using a method such as being put on the lower rim, and the upper rim and lower rim are handled as a rim assembly. Then, the integrated rim assembly is conveyed to a replacement device or a rim stock position outside the tire testing machine. Since the rim assembly is integrated and stored, the upper rim and the lower rim having the same diameter does not become separated from each other, thereby increasing performance in controlling operation. Also, when the rim assembly is conveyed from outside into the tire testing machine, an integrated rim assembly is conveyed, and the upper rim and the lower rim are divided so that tires can be mounted.

Various methods can be taken to integrate the upper rim and the lower rim in replacement of the rims. For replacement by suspending the rim assembly, possible methods include mounting a jig for integrating the upper rim and the lower rim from outside of the upper rim and the lower rim, or providing a mechanism that can integrate the upper rim and the lower rim on one or both of the upper rim and the lower rim.

A small bead width of a tire to be mounted to the upper rim and the lower rim during a test reduces a separation distance between the upper rim and the lower rim. Thus, for the latter of the above described methods for integrating the upper rim and the lower rim, there is a need to provide a mechanism for physically integrating the upper rim and the lower rim without undesirable contact with each other.

The present invention is made in consideration of the aforementioned circumstances, and has an object to provide a rim assembly, a tire testing machine, and a rim assembly replacement method which allow even a small tire to be mounted.

Solution to Problem

In order to achieve the above described object, a rim assembly, a tire testing machine, and a rim assembly replacement method according to the present invention adopt the following solutions.

Specifically, a first aspect of the present invention provides a rim assembly having a pair of a first rim and a second rim to which a tire to be tested is mounted, comprising: a pin provided on the first rim; a pin receiving portion provided on the second rim and engageable with the pin; and a groove portion formed in a surface on a first rim side of the second rim and having a groove that can house at least a part of a tip of the pin, the groove having a recessed shape in a sectional view.

According to this configuration, the first rim and the second rim are integrated by engaging the pin with the pin receiving portion. Hanging the first rim or the second rim on an upper side during engagement allows the other rim to be hanged by the first rim or the second rim on the upper side and simultaneously moved. When the tire is mounted to the first rim and the second rim and tested, it is desirable that the pin is disengaged from the pin receiving portion, and the pin and the pin receiving portion do not come into contact with each other. If the pin and the pin receiving portion vertically come into contact with each other, the pin may be damaged in case the first rim and the second rim are relatively rotated for some reason during the tire test. Thus, for a vertical relative size of the pin and the pin receiving portion, a sufficient vertical size has to be ensured to prevent the undesirable contact, which inevitably causes restriction of bead width.

In this aspect, the recessed groove that can house the pin tip is formed on the surface of the groove portion. Thus, when the tire is mounted to the first rim and the second rim and tested, and the pin faces the groove portion, the first rim and the second rim can be brought closer to each other as compared to a case without the groove portion. The pin receiving portion and the groove portion both constitute part of the second rim.

In the above described first aspect of the present invention, the tip of the pin may have a protrusion extending perpendicularly to an axial direction of the pin, and the pin receiving portion may have a sliding groove in which the protrusion slides, and a sliding opening in which the pin slides.

According to this configuration, the protrusion extends perpendicularly to the axial direction of the pin, and slides in the sliding groove in the pin receiving portion. Also, the pin slides in the sliding opening of the pin receiving portion. Thus, the pin engages with the pin receiving portion.

In the above described first aspect of the present invention, an upper surface of the protrusion and a part of the groove facing the protrusion when housing the part of the protrusion may each have a tapered shape.

According to this configuration, the protrusion has a larger thickness at a proximal end than at a tip, and thus strength of the proximal end can be maintained. The support has a larger thickness at a proximal end than at an end, and thus strength of the proximal end can be maintained. This allows the rim assembly to be hanged and moved using the pin and the pin receiving portion while maintaining high strength of the pin and the pin receiving portion. Also, the recessed groove that can house the tip of the pin is formed in the surface of the support, thereby allowing the first rim and the second rim to be brought close to each other.

In the above described first aspect of the present invention, the pin receiving portion and the groove portion may be formed in a circumferential direction of the second rim, and the groove may be also formed in the circumferential direction.

According to this configuration, when disengagement is performed, and the pin tip and the surface of the pin receiving portion are close to each other in a case where the tire is mounted to the rim assembly and tested, the pin tip moves along the circumferentially formed groove even if the first rim and the second rim relatively rotate around an axis. Thus, the pin and the pin receiving portion do not come into contact with each other.

In the above described first aspect of the present invention, the pin receiving portion and the groove portion may be formed in the same section, and the groove of the groove portion may be provided on a first rim side of the pin receiving portion.

According to this configuration, the groove with a recessed section that can house at least a part of the tip of the pin is formed in the surface of the pin receiving portion on the side of the first rim. Thus, when the tire is mounted to the first rim and the second rim and tested, the first rim and the second rim can be brought close to each other if the pin receiving portion is provided at a portion where the pin faces.

In the above described first aspect of the present invention, the rim assembly may further include a stand provided on at least one of the first rim and the second rim, and the stand may support the first rim or the second rim located thereabove at the time when the pin is engaged with the pin receiving portion.

According to this configuration, when one of the first rim and the second rim is placed on an upper surface of the other of the first rim and the second rim, the stand supports the rim located thereon. Thus, while the rim assembly is stored in a storeroom, the pin and the pin receiving portion do not support a load of the first rim or the second rim located thereon, thereby preventing damage to the pin and the pin receiving portion due to an impact.

Also, a second aspect of the present invention provides a tire testing machine including: a rim assembly according to the above described first aspect of the present invention; and a hanging unit that supports the first rim or the second rim to hang the rim assembly.

According to this configuration, when the hanging unit supports and hangs the first rim or the second rim located thereon, and the first rim is engaged with the second rim, the first rim and the second rim can be simultaneously moved. Also, when the hanging unit supports and hangs the first rim or the second rim located thereon, and the first rim is disengaged from the second rim, since the recessed groove that can house the pin tip is formed in the surface of the pin receiving portion, the first rim and the second rim can be brought close to each other as compared to the case without a groove formed in the surface of the pin receiving portion. Thus, in the tire testing machine including the rim assembly that can be replaced using the pin and the pin receiving portion, even a small tire as an object to be tested can be tested.

Also, a third aspect of the present invention provides a rim assembly replacement method of a tire testing machine using a rim assembly having a pair of a first rim and a second rim to which a tire to be tested is mounted, the method including a step of supporting the first rim or the second rim to hang the rim assembly, the rim assembly including the following elements: a pin provided on the first rim; a pin receiving portion provided on the second rim and engageable with the pin; and a groove portion formed in a surface on a first rim side of the second rim and having a groove that can house at least a part of a tip of the pin, the groove having a recessed shape in a sectional view.

Advantageous Effects of Invention

According to the present invention, even a small tire can be mounted to the rim assembly and tested.

DESCRIPTION OF EMBODIMENTS

Now, with reference to FIG. 1, a tire testing machine according to an embodiment of the present invention will be described.

The tire testing machine includes, for example, a tire uniformity measurement machine 12 that measures uniformity of a Lire. The tire uniformity measurement machine 12 tests a tire mounted to a rim assembly, and operates a cylindrical load wheel 22 to abut against the tire rotated by a lower spindle 16. The tire uniformity measurement machine 12 measures an applied load using a load cell provided above and below the load wheel 22.

The load wheel 22 can travel on a rail 23 to move toward or away from the lower spindle 16.

Figure 24:
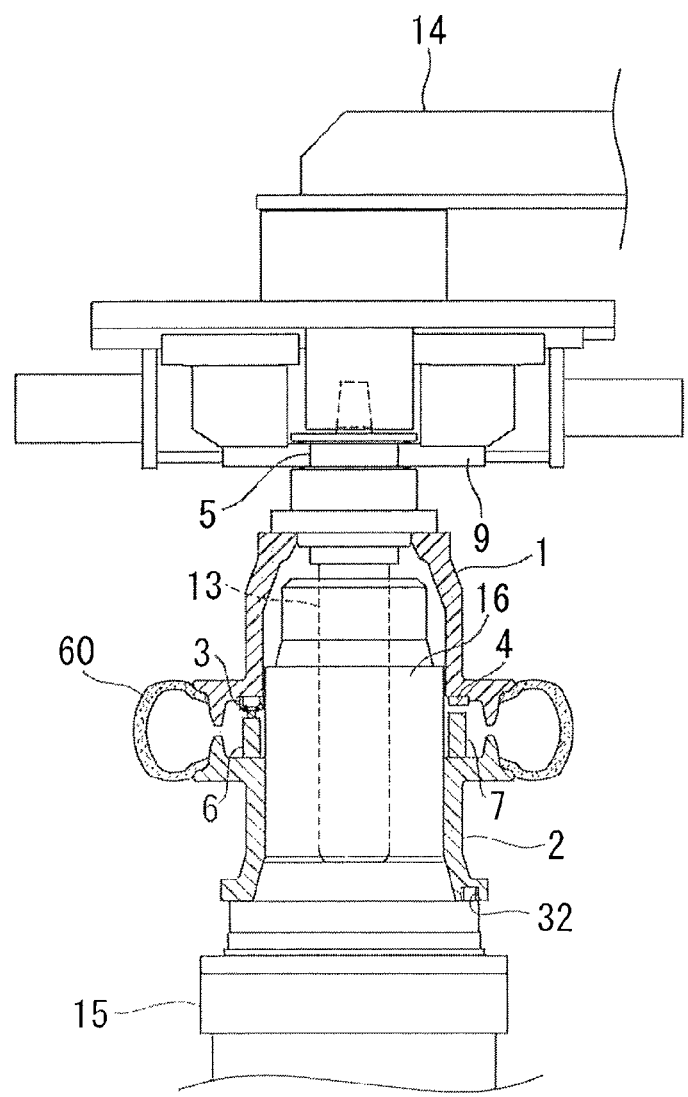
FIG. 24 is a vertical sectional view showing a rim assembly, a rim elevator, and a lower spindle according to an embodiment of the present invention.

As shown in FIG. 24, a tire 60 to be tested is mounted to an upper rim 1 and a lower rim 2. At this time, the upper rim 1 is gripped by a chuck mechanism 9 of a rim elevator 14, and the lower rim 2 is placed on the lower spindle 16 on a pedestal 15. The rim elevator 14 is lowered, and a lower portion of an upper rim shaft 13 is inserted into the lower spindle 16. The upper rim shaft 13 and the lower spindle 16 are coupled to each other at a predetermined insertion position by a lock mechanism.

The lower spindle 16 is rotationally driven by a motor. When the lower spindle 16 is coupled to the upper rim shaft 13 by the lock mechanism, the lower spindle 16 is rotated together with the upper rim shaft 13.

The rim elevator 14 can be vertically raised and lowered, and has the chuck mechanism 9 mounted to a support 8. The rim elevator 14 is raised and lowered along a frame 24 via a power train such as a ball screw 25 driven by the motor. When the rim elevator 14 moves up, the lock mechanism is unlocked to uncouple the upper rim shaft 13 from the lower spindle 16.

In a rim stocker 11, a swivel 20 travels on a rail 21 to move toward or away from the lower spindle 16.

A swivel shaft 17 is provided on the swivel 20. A plurality of stocker frames 18 are connected to the swivel shaft 17, and the swivel shaft 17 rotates the stocker frame 18 around an axis of the swivel shaft 17. Thus, the swivel shaft 17 can move the upper rim 1 and the lower rim 2 placed on a rim pedestal 19 of the stocker frame 18 close to or away from the lower spindle 16.

Next, a rim assembly including a pair of the upper rim 1 and the lower rim 2 will be described.

Figure 3:
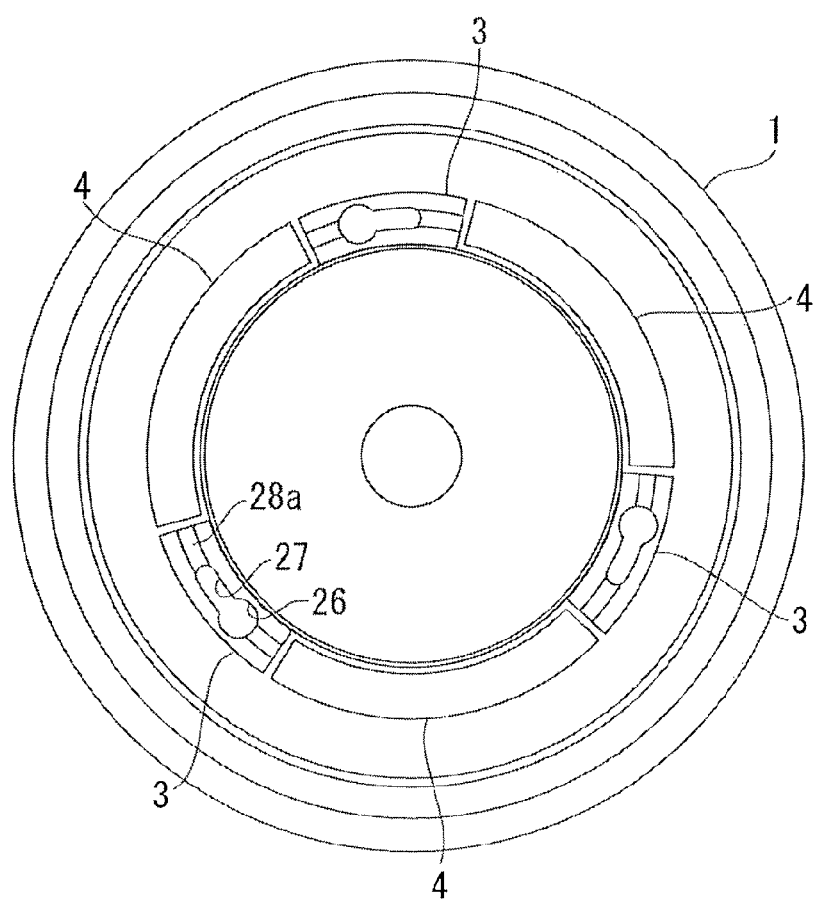
FIG. 3 is a bottom view showing the upper rim according to the embodiment, taken along the arrow-directed line A-A in FIG. 2.
Figure 4:
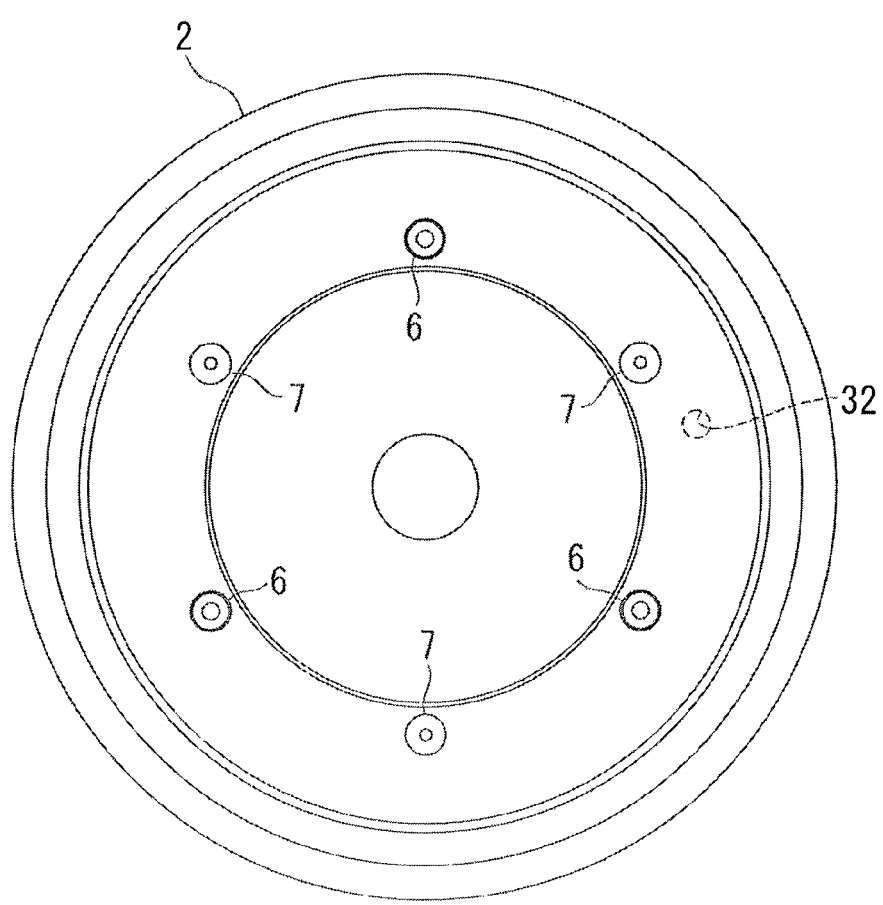
FIG. 4 is a top view showing the lower rim according to the embodiment, taken along the arrow-directed line B-B in FIG. 2.
Figure 25:
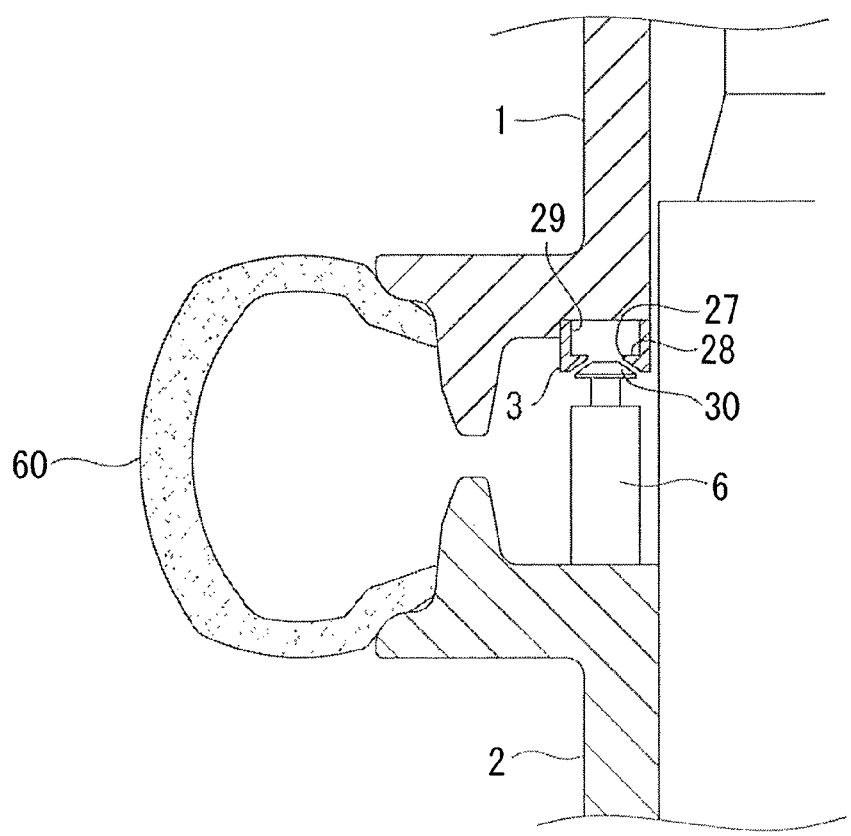
FIG. 25 is a partially enlarged vertical sectional view showing an upper rim and a lower rim according to the embodiment.

The upper rim 1 includes three pin receiving portions 3 and three stand receiving portions 4 circumferentially and alternately arranged on a lower surface thereof inside a tire mounting portion. FIG. 3 shows the lower surface of the upper rim 1. The lower rim 2 includes three pins 6 and three stands 7 circumferentially and alternately arranged on an upper surface thereof inside the tire mounting portion. FIG. 4 shows an upper surface of the lower rim 2. The pins 6 engage with the pin receiving portions 3 for moving the rim assembly. The stands 7 abut against the stand receiving portions 4 while the rim assembly is in a storeroom. Meanwhile, during a test, as shown in FIGS. 24 and 25, the pins 6 are disengaged and separated from the pin receiving portions 3, and the stands 7 are also separated from the stand receiving portions 4.

Figure 6:
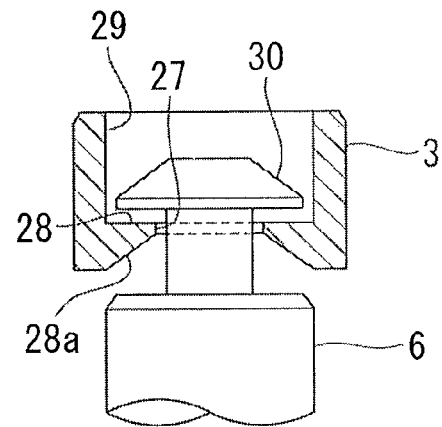
FIG. 6 is a vertical sectional view showing a pin and the pin receiving portion according to the embodiment, taken along the line C-C in FIG. 5.
Figure 7:
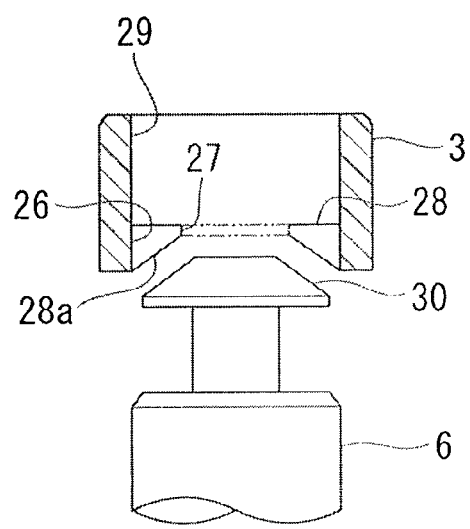
FIG. 7 is a vertical sectional view showing the pin and the pin receiving portion according to the embodiment, taken along the line D-D in FIG. 5.
Figure 8:
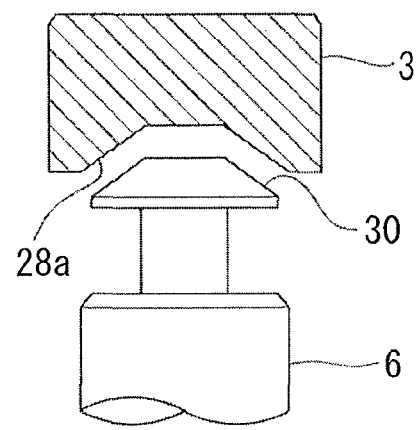
FIG. 8 is a vertical sectional view showing the pin and the pin receiving portion according to the embodiment, taken along the line E-E in FIG. 5.

For example as shown in FIGS. 6 to 8, the pin 6 has a tapered protrusion 30 formed at a tip via a neck having a smaller diameter than a pin body. The protrusion 30 extends perpendicularly to an axial direction of the pin 6, and has a larger thickness at a proximal end than at a tip. Thus, strength of the proximal end of the protrusion 30 can be maintained. In this embodiment, a case is described where the protrusion 30 extends to opposite sides relative to the axis of the pin 6 in a vertical sectional view of the pin 6, but the present invention is not limited to this example. For example, the protrusion 30 may extend to only one side relative to the axis of the pin 6.

Figure 5:
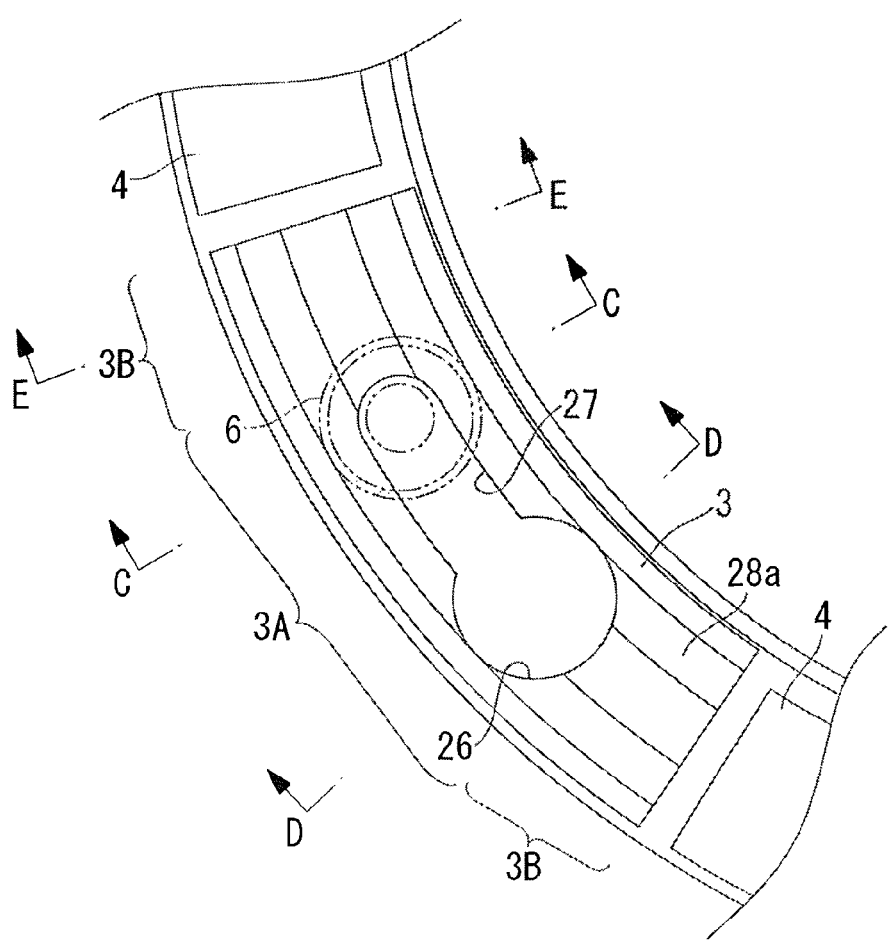
FIG. 5 is a top view showing a pin receiving portion on the upper rim according to the embodiment.

As shown in FIG. 5, the pin receiving portion 3 includes an insertion opening 26 and a sliding opening 27. The protrusion 30 of the pin 6 can be placed into and out of the insertion opening 26. The sliding opening 27 is formed on one side of the insertion opening 26, and extends circumferentially of the upper rim 1. The sliding opening 27 has a width smaller than a diameter of the protrusion 30 of the pin 6 and larger than the neck of the pin 6. The pin receiving portion 3 is divided into a first region 3A that engages with the pin 6 and a second region 3B which is the region other than the first region 3A as shown in FIG. 5. The above described insertion opening 26 and the sliding opening 27 are formed in the first region 3A.

Also, for example, as shown in FIGS. 6 and 7, the pin receiving portion 3 includes a sliding groove 29 between two facing side walls which are circumferentially provided. Further, the pin receiving portion 3 has a support 28 that protrudes toward the sliding opening 27 and supports the protrusion 30 of the pin 6. The support 28 has a larger thickness at a proximal end than at a tip end. Thus, strength of the proximal end of the support 28 can be maintained. In a surface of the support 28 on a side of the lower rim 2, a recessed groove 28a is formed that can house the protrusion 30 provided at the tip of the pin 6. The support 28 that supports the protrusion 30 is formed in the pin receiving portion 3, and thus the pin 6 engages with the pin receiving portion 3. A state where the support 28 supports the protrusion 30 is a state where an upper surface (a surface on a side of the upper rim 1) of the support 28 supports a lower surface (a surface on a side of the lower rim 2) of the protrusion 30. In the example shown in FIGS. 5 to 8, the recessed groove 28a is formed circumferentially of the upper rim 1 across the first region 3A and the second region 3B. The first region 3A in this embodiment shows an example in which both the groove portion and the pin receiving portion are formed in one place, and the second region 3B shows an example in which only the groove portion is directly provided in the upper rim 1.

Unlike this embodiment, if the pin 6 and the pin receiving portion 3 vertically come into contact with each other, the pin 6 may be damaged in relative rotation of the upper rim 1 and the lower rim 2 for some reason during a tire test. Thus, as for a vertical relative size of the pin 6 and the pin receiving portion 3, a sufficient vertical size has to be ensured to prevent the undesirable contact, which inevitably causes restriction of bead width.

Meanwhile, in this embodiment, the recessed groove 28a that can house the tip of the pin 6 is formed on the surface of the pin receiving portion 3, and thus the upper rim 1 and the lower rim 2 can be brought close to each other as compared to a case without the recessed groove 28a formed in the surface of the pin receiving portion 3. Thus, a tire testing machine using the rim assembly that can be moved using the pin 6 and the pin receiving portion 3 can measure even a small tire as an object to be tested, for example, a tire having a bead width of 3 inches or less, without undesirable contact between the upper rim 1 and the lower rim 2. Also, as described later with reference to FIGS. 22 and 23, a stroke distance $b_1$ required for engagement between the pin 6 and the pin receiving portion 3 can be reduced. Thus, the tire testing machine using the rim assembly that can be replaced using the pin 6 and the pin receiving portion 3 can measure even a small tire as an object to be tested.

As shown in FIG. 5, the recessed groove 28a that can house the tip of the pin 6 is circumferentially formed along a surface of the pin receiving portion 3 on the side of the lower rim 2. According to this configuration, when disengagement is performed, and the tip of the pin 6 and the surface of the pin receiving portion 3 face and are close to each other in an case where the tire is mounted to the rim assembly and tested, the tip of the pin 6 moves along the recessed groove 28a which is circumferentially formed even if the upper rim 1 and the lower rim 2 relatively rotate around the axis. Thus, as shown in FIG. 8, the pin 6 and the pin receiving portion 3 do not come to contact with each other.

The stand 7 is provided on the upper surface of the lower rim 2 so as to protrude toward the upper rim 1. Also, the stand receiving portion 4 is provided on the lower surface of the upper rim 1 so as to protrude toward the lower rim 2 correspondingly to the stand 7. The stand 7 and the stand receiving portion 4 have heights such that when the upper rim 1 is placed on the upper surface of the lower rim 2, the pin 6 and the pin receiving portion 3 do not support the load of the upper rim 1, and the stand 7 and the stand receiving portion 4 support the upper rim 1.

According to the configuration of the stand 7 and the stand receiving portion 4 as described above, the stand 7 supports the upper rim 1, and thus the pin 6 and the pin receiving portion 3 do not support the load of the upper rim 1 which the rim assembly is stored in a storeroom, thereby preventing a damage to the pin 6 and the pin receiving portion 3 due to an impact or the like.

Next, a replacement operation of the rim assembly in the tire testing machine of the present invention will be described.

Figure 1:
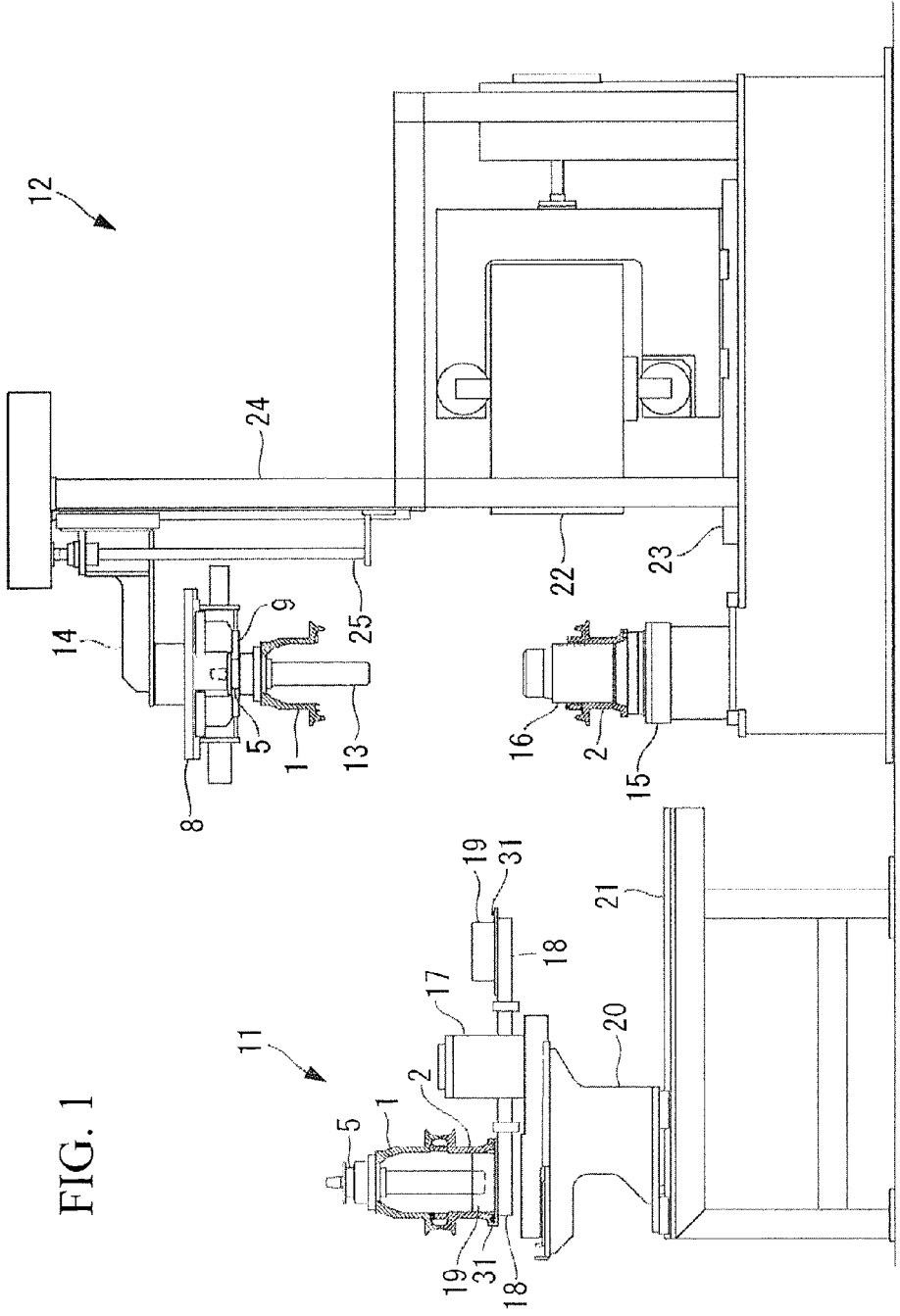
FIG. 1 is a vertical sectional view showing a tire testing machine according to an embodiment of the present invention.
Figure 2:
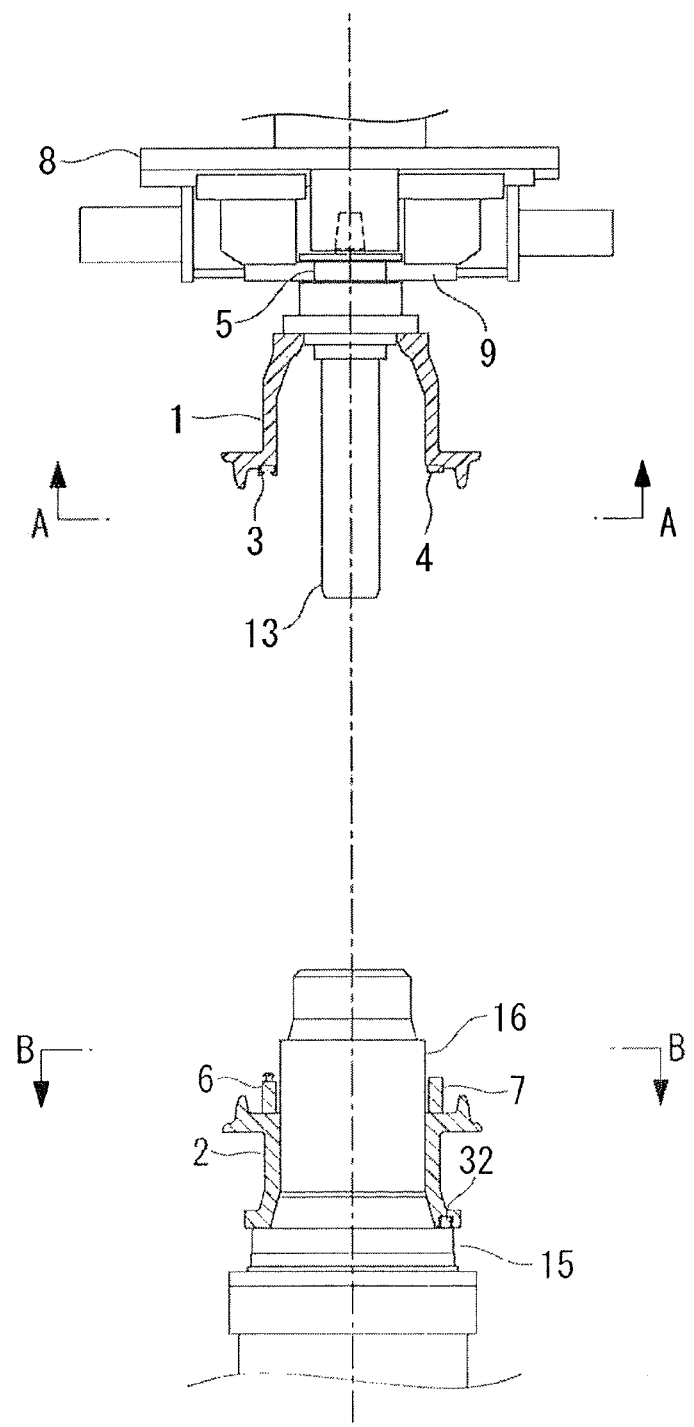
FIG. 2 is a vertical sectional view showing an upper rim and a lower rim, a support of a rim elevator, and a lower spindle according to the embodiment.
Figure 9:
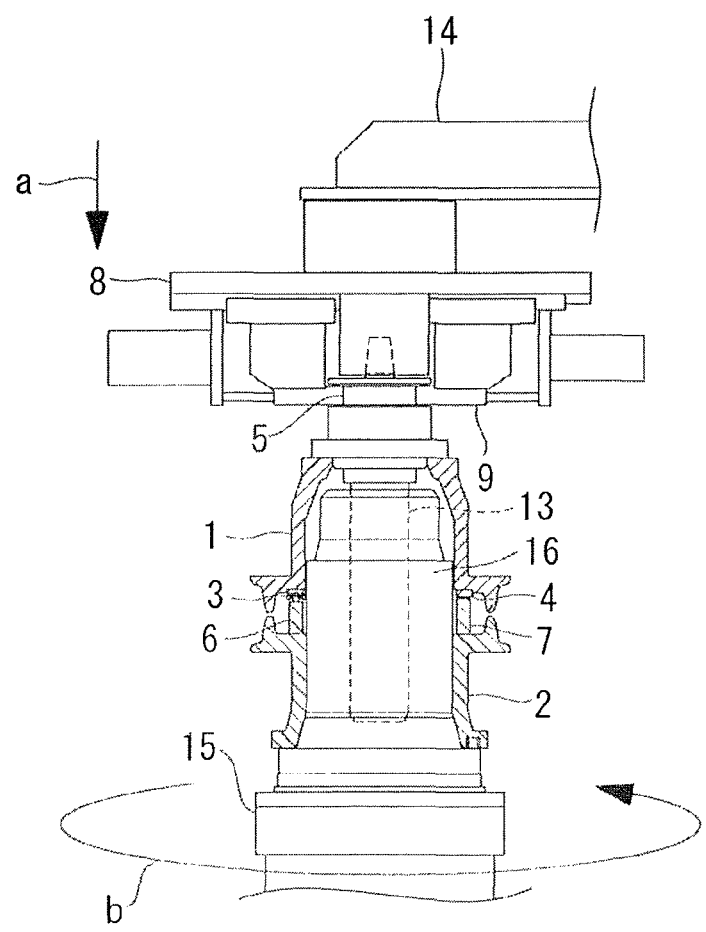
FIG. 9 is a vertical sectional view showing a rim assembly, the rim elevator, and the lower spindle according to the embodiment.
Figure 16:
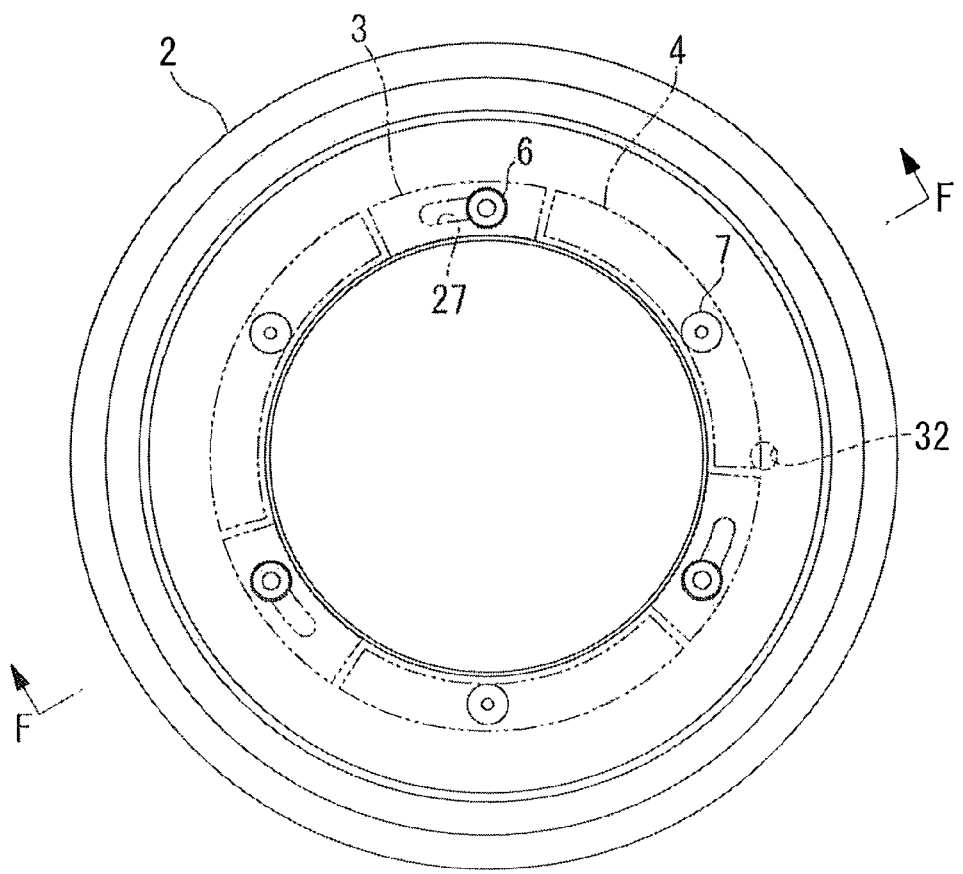
FIG. 16 is a top view showing the lower rim according to the embodiment.
Figure 19:
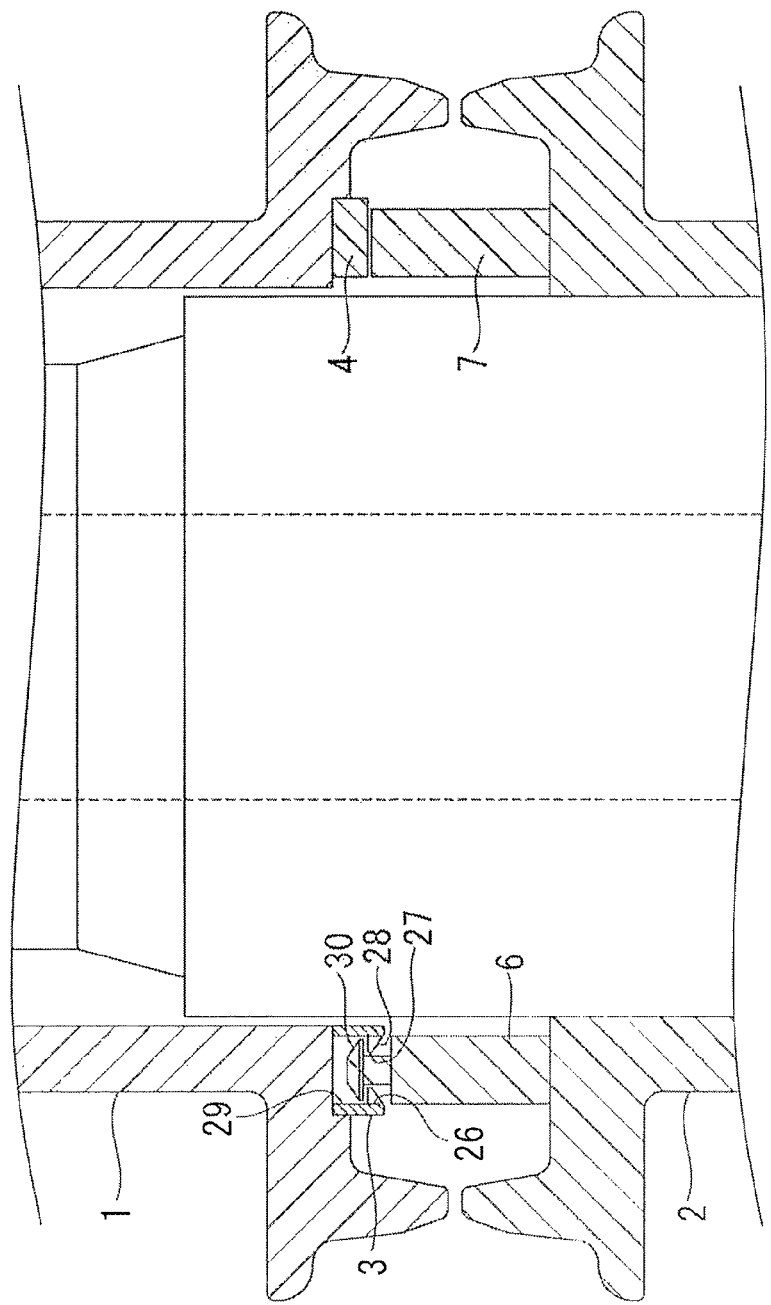
FIG. 19 is a partially enlarged vertical sectional view showing the upper rim and the lower rim according to the embodiment, taken along the line F-F in FIG. 16.

First, a state is that the upper rim 1 is separated from the lower rim 2, and that the upper rim 1 is located in an upper position as shown in FIGS. 1 and 2. From this state, as shown by an arrow a in FIG. 9, the rim elevator 14 is lowered to move the upper rim 1 downward, and the upper rim 1 is mounted on the lower rim 2 as shown in FIG. 9. At this time, a phase relationship between the upper rim 1 and the lower rim 2 is as shown in FIG. 16. FIG. 19 is a partially enlarged view of FIG. 9, and a vertical sectional view taken along the line F-F in FIG. 16. Specifically, the protrusion 30 of the pin 6 is aligned with the insertion opening 26 of the pin receiving portion 3, and the protrusion 30 is inserted into the insertion opening 26.

Figure 17:
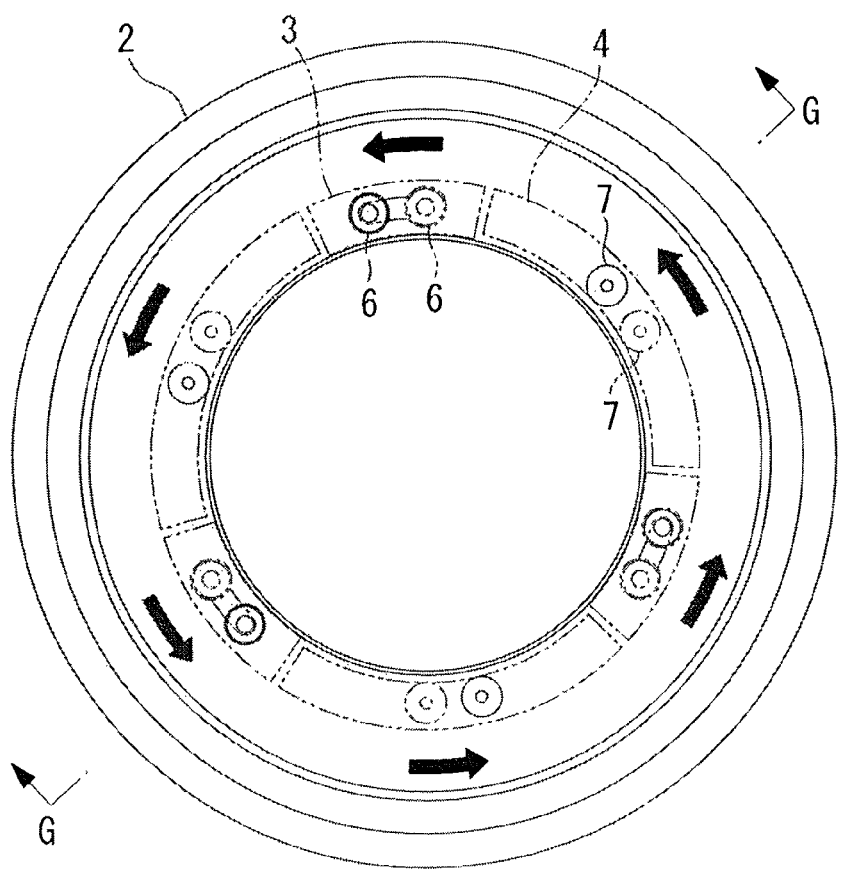
FIG. 17 is a top view showing the lower rim according to the embodiment.

Next, as shown by an arrow b in FIG. 9, the lower spindle 16 is rotated to rotate the lower rim 2 with respect to the upper rim 1. At this time, the phase relationship between the upper rim 1 and the lower rim 2 is as shown in FIG. 17. Specifically, counterclockwise rotation of the lower rim 2 causes the protrusion 30 of the pin 6 to move in the sliding groove 29 in the pin receiving portion 3, and as shown in FIG. 6, the pin 6 engages with the pin receiving portion 3. The example in which the counterclockwise rotation causes engagement between the pin 6 and the pin receiving portion 3 has been described above, but positions of the insertion opening 26 and the sliding groove 29 in the pin receiving portion 3 may be inverted so that clockwise rotation causes engagement between the pin 6 and the pin receiving portion 3.

Figure 21:
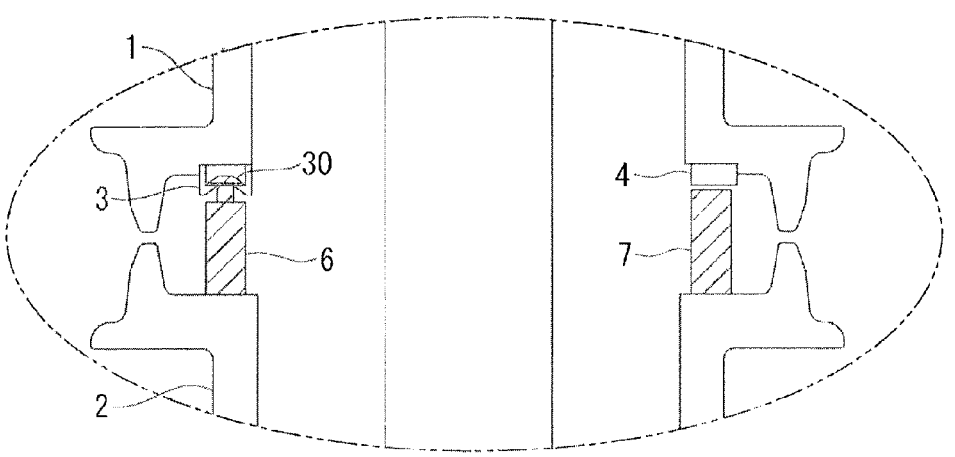
FIG. 21 is a partially enlarged vertical sectional view showing the upper rim and the lower rim according to the embodiment, taken along the line G-G in FIG. 17.

The pins 6 engage with the pin receiving portions 3 to integrate the upper rim 1 with the lower rim 2. Then, as shown by an arrow c in FIG. 10, the rim elevator 14 is raised to move the upper rim 1 upward together with the lower rim 2. At this time, as shown in FIG. 21, the pin receiving portions 3 of the upper rim 1 support the pins 6, and the lower rim 2 is hanged from the upper rim 1.

Figure 10:
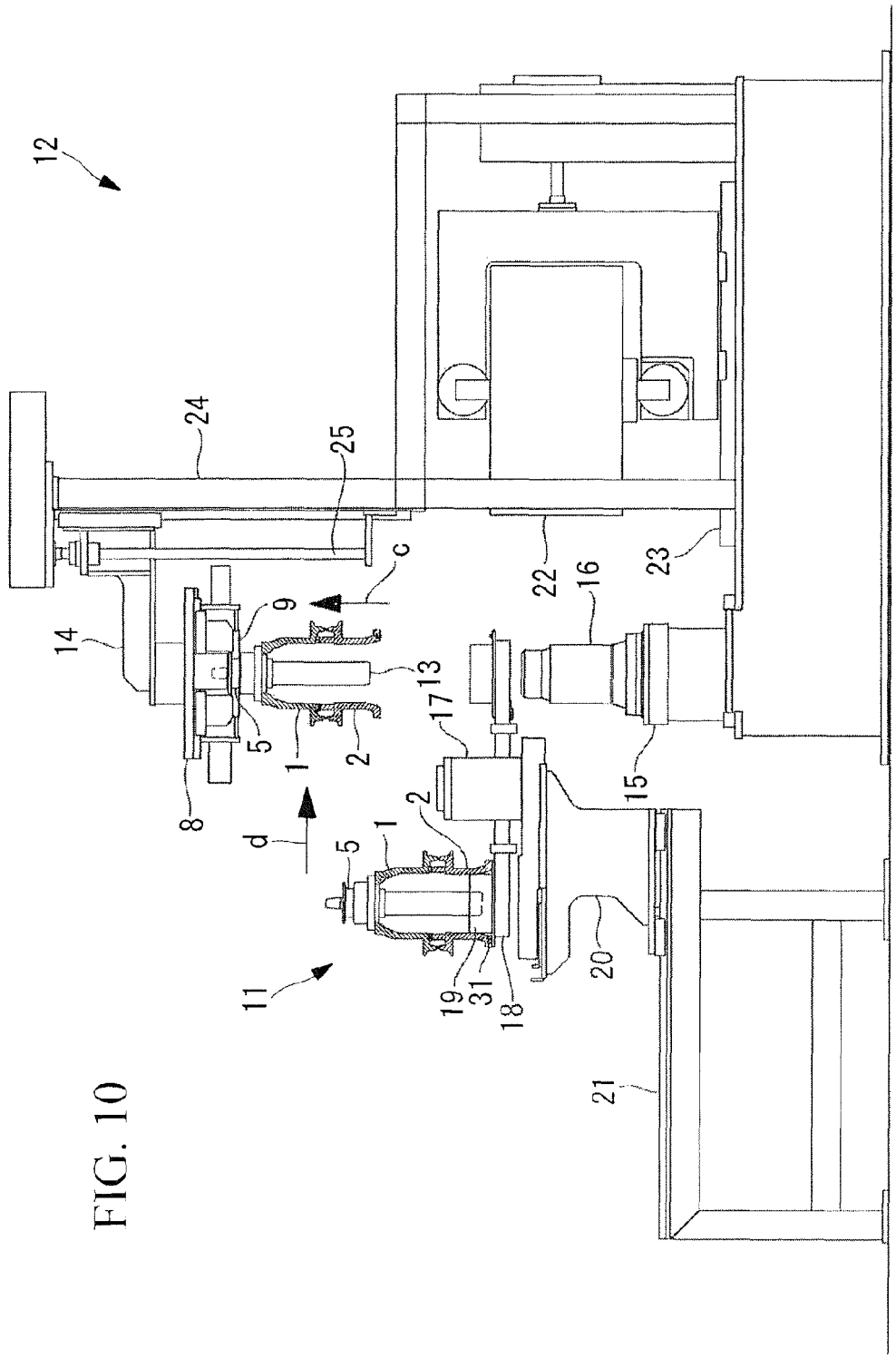
FIG. 10 is a vertical sectional view showing a tire testing machine according to the embodiment.

Then, as shown by an arrow d in FIG. 10, the rim stocker 11 is lowered toward the lower spindle 16. At this time the stocker frame 18 on which no rim assembly is placed is placed below the rim assembly supported by the rim elevator 14. Next, as shown by an arrow e in FIG. 11, the rim elevator 14 is lowered, and the upper rim 1 and the lower rim 2 are placed on the rim pedestal 19 on the stocker frame 18. At this time, a positioning projection 31 protruding from the upper surface of the stocker frame 18 is inserted into a positioning hole 32 formed in the bottom surface of the lower rim 2.

Figure 20:
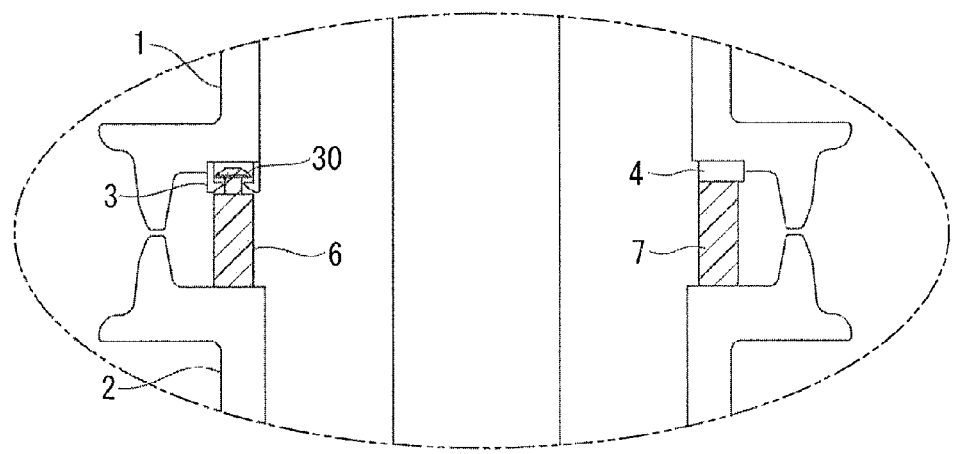
FIG. 20 is a partially enlarged vertical sectional view showing the upper rim and the lower rim according to the embodiment, taken along the line G-G in FIG. 17.

Thus, as shown in FIG. 20, the stand receiving portion 4 abuts against the upper surface of the stand 7, and thereby the lower rim 2 supports the upper rim 1. At this time, the pin 6 and the pin receiving portion 3 do not come contact with each other, and the pin 6 do not support the load of the upper rim 1, thereby preventing damage to the pin 6.

Figure 11:
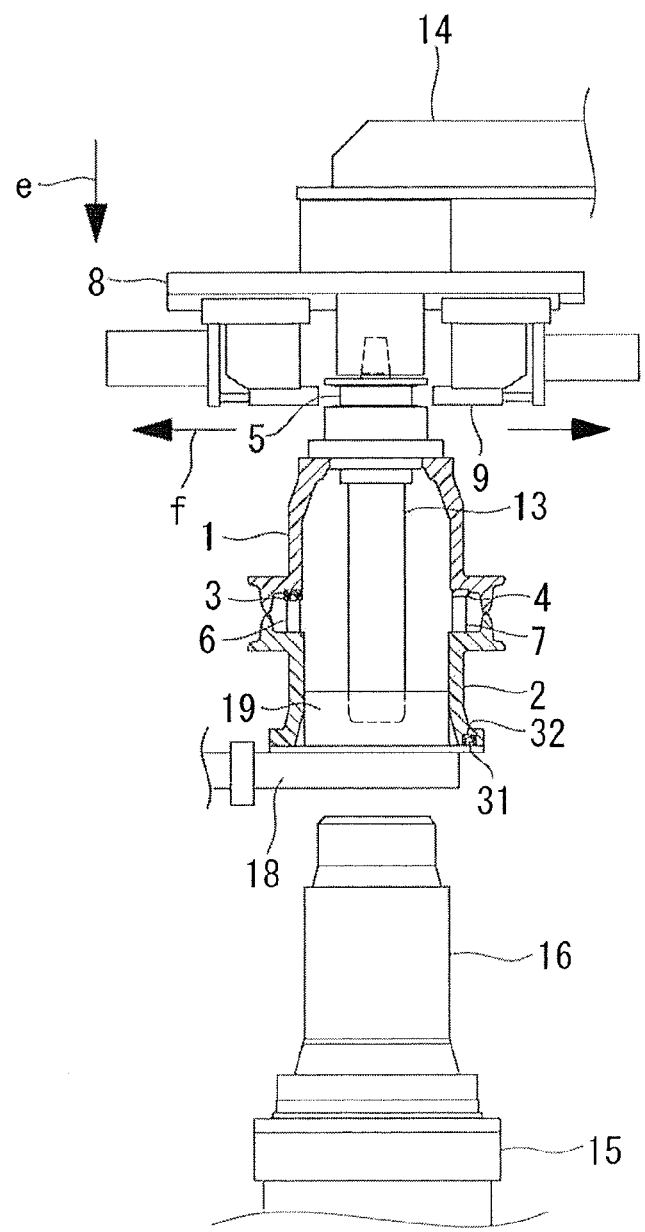
FIG. 11 is a vertical sectional view showing the rim assembly, the rim elevator, a stocker frame, and the lower spindle according to the embodiment.
Figure 12:
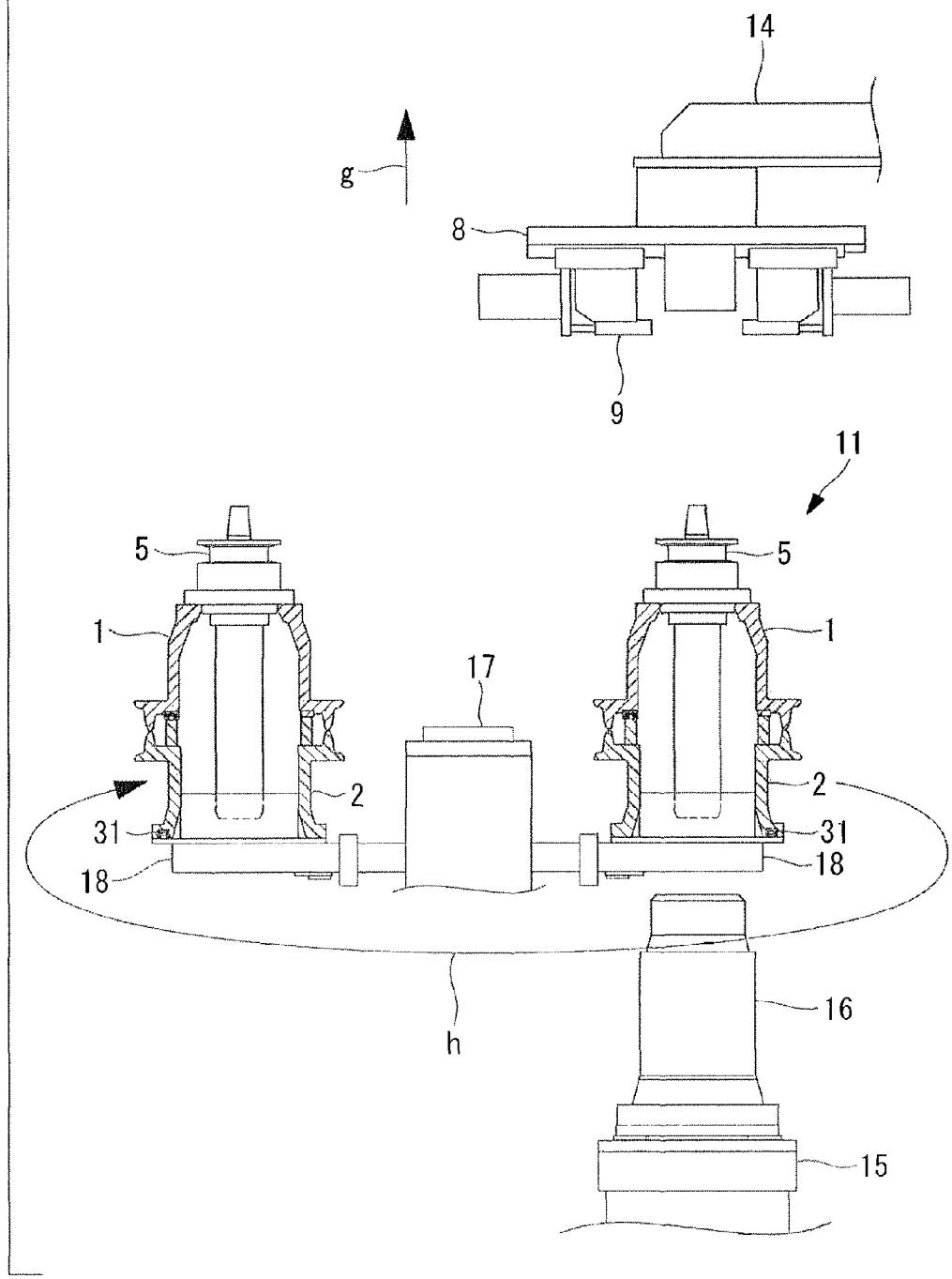
FIG. 12 is a vertical sectional view showing the rim assembly, the rim elevator, the rim stocker, and the lower spindle according to the embodiment.

When the rim assembly is placed on the stocker frame 18, as shown by an arrow f in FIG. 11, the chuck mechanism 9 that has gripped the upper rim 1 is released. Then, as shown by an arrow g in FIG. 12, the rim elevator 14 is separated from the rim stocker 11. Then, as shown by an arrow h in FIG. 12, the stocker frame 18 is rotated around the axis of the swivel shaft 17, and a rim assembly newly used for a test is located below the rim elevator 14.

Figure 13:
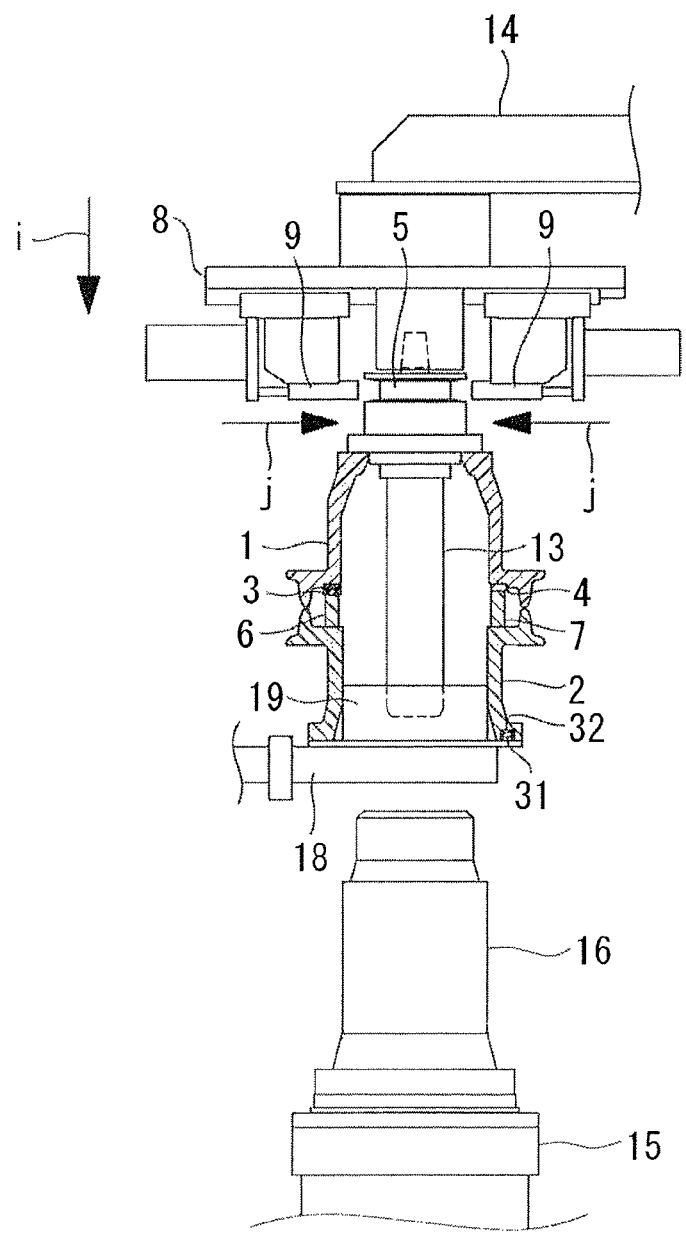
FIG. 13 is a vertical sectional view showing the rim assembly, the rim elevator, the stocker frame, and the lower spindle according to the embodiment.

Then, as shown by an arrow i in FIG. 13, the rim elevator 14 is lowered so that the chuck mechanism 9 reaches a position of a gripped portion 5 of the upper rim 1. Then, as shown by an arrow j in FIG. 13, the chuck mechanism 9 is moved to the griped portion 5 of the upper rim 1 so that the chuck mechanism 9 grips the upper rim 1. At this time, the upper rim 1 engages the lower rim 2.

Figure 14:
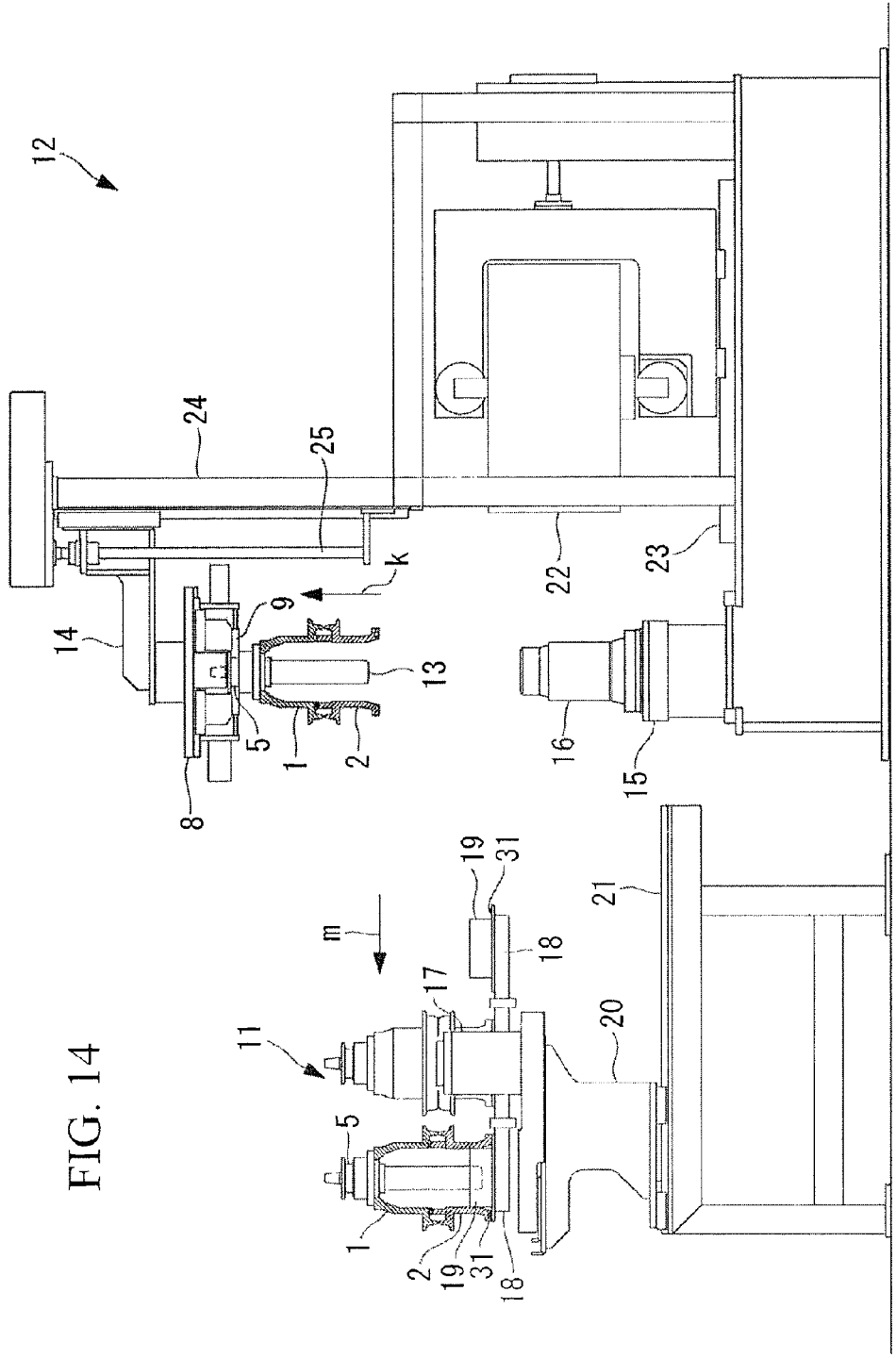
FIG. 14 is a vertical sectional view showing a tire testing machine according to the embodiment.

Then, as shown by an arrow k in FIG. 14, with the rim assembly being gripped, the rim elevator 14 is raised to move the upper rim 1 upward together with the lower rim 2. Also, as shown by an arrow m in FIG. 14, the rim stocker 11 is separated from the lower spindle 16. When the stocker frame 18 of the rim stocker 11 is retracted from a position above the lower spindle 16, as shown by an arrow n in FIG. 15, the rim elevator 14 is lowered to move the upper rim 1 downward, and fix the lower rim 2 to the lower spindle 16.

Figure 15:
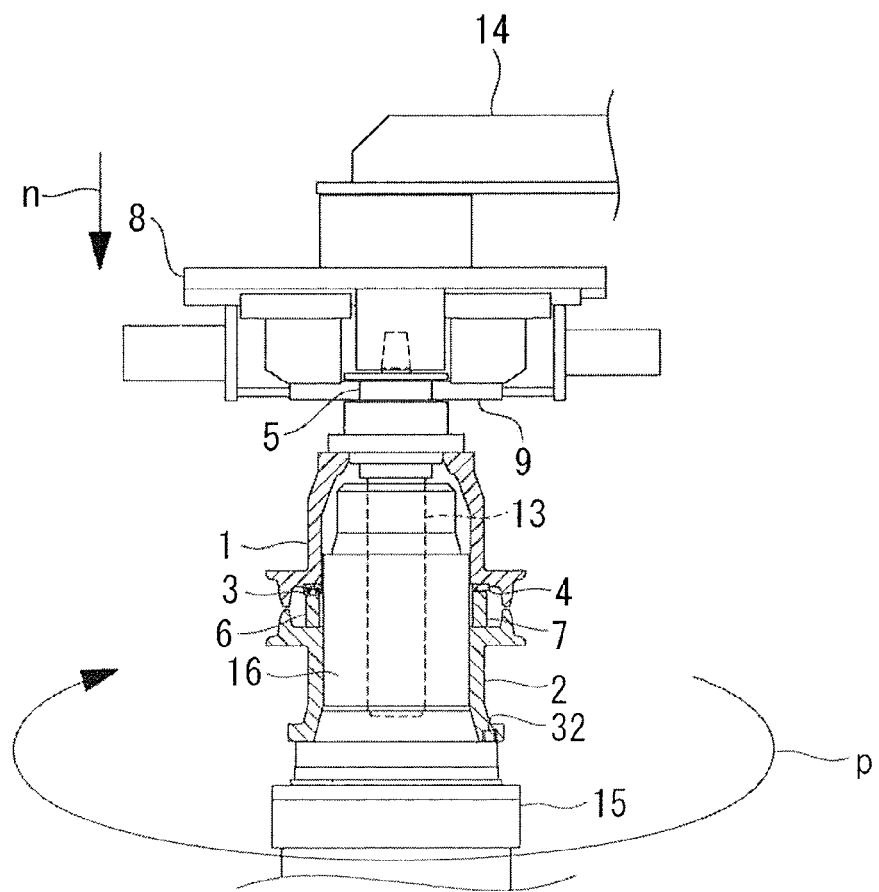
FIG. 15 is a vertical sectional view showing the rim assembly, the rim elevator, and the lower spindle according to the embodiment.
Figure 18:
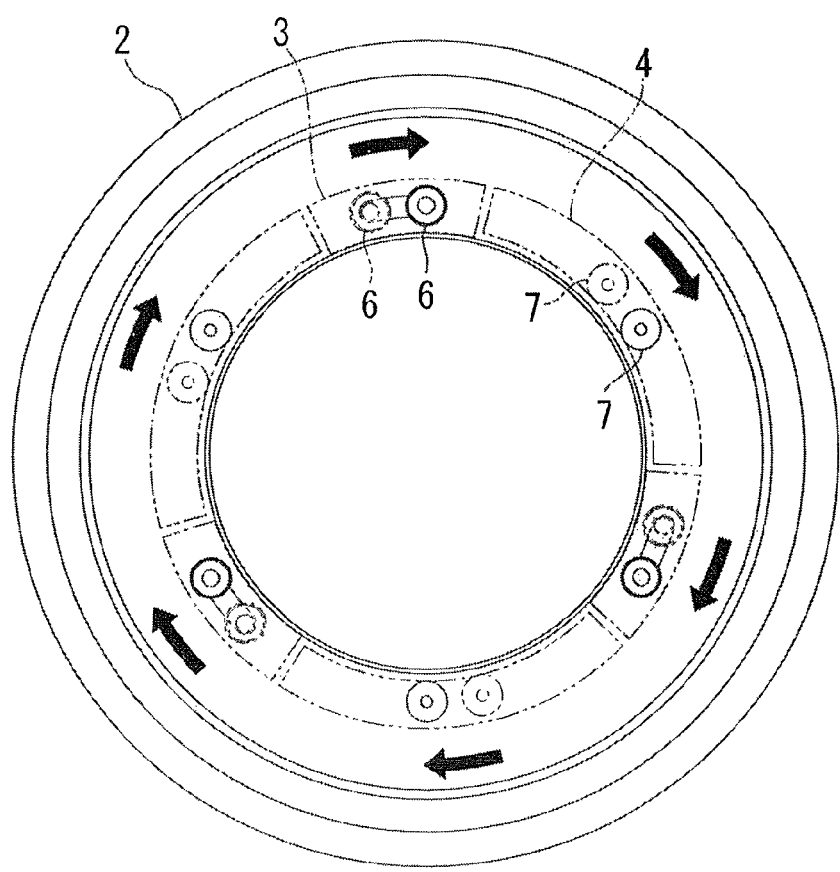
FIG. 18 is a top view showing the lower rim according to the embodiment.

As shown by an arrow p in FIG. 15, the lower spindle 16 is rotated to rotate the lower rim 2 with respect to the upper rim 1. At this time, the phase relationship between the upper rim 1 and the lower rim 2 is as shown in FIG. 18. Specifically, clockwise rotation of the lower rim 2 causes the protrusion 30 of the pin 6 to move in the sliding groove 29 in the pin receiving portion 3, and reach the insertion opening 26. When the upper rim 1 engages the lower rim 2 by clockwise rotation, counterclockwise rotation is performed. Thus, the pin 6 can be disengaged from the pin receiving portion 3. Specifically, the rim elevator 14 can be raised to separate the pin 6 from the pin receiving portion 3 as shown in FIG. 7.

With the pin 6 being separated from the pin receiving portion 3, the tire 60 is mounted to the upper rim 1 and the lower rim 2 as shown in FIG. 24, thereby allowing measurement of the tire 60. At this time, even if the tire 60 has a small width, as shown in FIG. 25, the protrusion 30 of the pin 6 is housed in the recessed groove 28a in the pin receiving portion 3, thereby preventing undesirable contact between the pin 6 and the pin receiving portion 3.

Next, with reference to FIGS. 22 and 23, the relationship between the pin 6 and the pin receiving portion 3 will be described.

Figure 23:
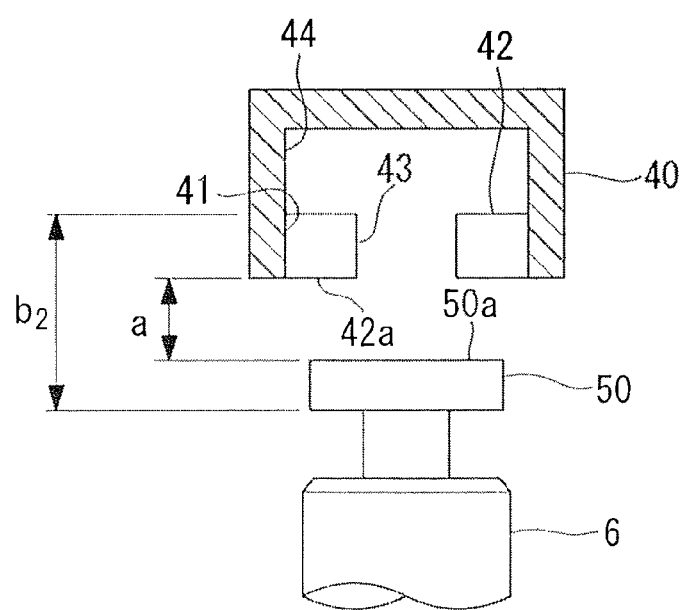
FIG. 23 is a vertical sectional view showing a pin and a pin receiving portion of a related technique.

Unlike the above described embodiment, a case where a protrusion 50 of the pin 6 has a cylindrical shape rather than a tapered shape, and no groove is formed on a surface of a support 42 of the pin receiving portion 40 is firstly described, as shown in FIG. 23, with respect to a relationship between the pin 6 and a pin receiving portion 40.

At this time, the pin receiving portion 40 has an insertion opening 41 and a sliding opening 43. A sliding groove 44 is formed between two facing side walls provided circumferentially of the pin receiving portion 40. Further, the pin receiving portion 40 has the support 42 that protrudes toward the sliding opening 43 and supports the protrusion 50 of the pin 6.

When a tire to be tested is mounted to the upper rim 1 and the lower rim 2, a distance between a tip 50a of the protrusion 50 of the pin 6 and a lower surface 42a of the support 42 of the pin receiving portion 40 has a spacing distance a. The spacing distance a is a distance that the pin 6 and the pin receiving portion 40 do not interfere with each other during a test of a tire having an applicable minimum bead width. At this time, to cause the protrusion 50 of the pin 6 to engage the support 42 of the pin receiving portion 40, the upper rim 1 needs to move downward by at least a stroke distance $b_2$ shown in FIG. 23. It is conceivable that the spacing distance a is increased to increase the stroke distance $b_2$, but in this case, an access distance between the upper rim 1 and the lower rim 2 during the tire test is increased, thereby making measurement of a tire with a small bead width unavailable.

Thus, it is necessary to reduce the stroke distance $b_2$ while ensuring the spacing distance a and preventing an increase in the access distance between the upper rim 1 and the lower rim 2. In this embodiment, a case is described, and the case is, as shown in FIG. 22, when the tire to be tested is mounted to the upper rim 1 and the lower rim 2, the distance between the upper surface 30a of the protrusion 30 of the pin 6 and the recessed groove 28a of the support 28 of the pin receiving portion 3 is the same spacing distance a as in FIG. 23.

Figure 22:
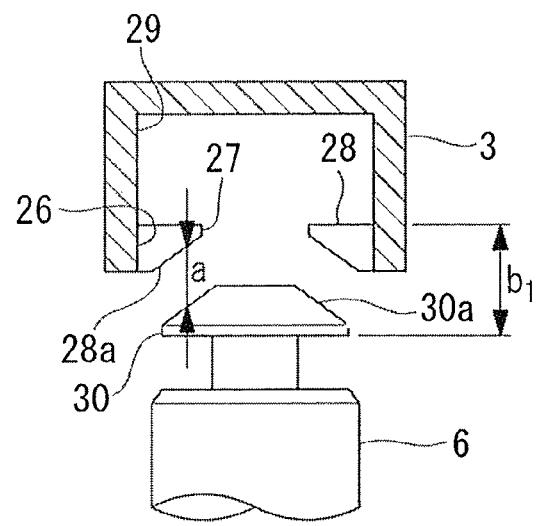
FIG. 22 is a vertical sectional view showing the pin and the pin receiving portion according to the embodiment.

In this embodiment, the recessed groove 28a that can house the tip of the pin 6 is formed in the surface of the pin receiving portion 3, and thus for the spacing distance a, the upper rim 1 may move down by at least the stroke distance $b_1$ shown in FIG. 22 in order to cause the protrusion 30 of the pin 6 to engage the support 28 of the pin receiving portion 3. The stroke distance $b_1$ in this embodiment is shorter than the stroke distance $b_2$ in the example shown in FIG. 23. Thus, according to this embodiment, a tire having a smaller bead width than a case without the recessed groove 28a can be tested while ensuring as long a spacing distance a as possible during the test.

In the above described embodiment, the case has been described where the protrusion 30 provided at the tip of the pin 6 has a tapered shape, but the present invention is not limited to this example. For example, the protrusion 30 may have a curved surface such as have a bowl shape, or a cylindrical shape. If the recessed groove 28a that does not come into contact with the protrusion 30 is formed in the surface of the support 28 of the pin receiving portion 3, the upper rim 1 and the lower rim 2 can be brought close to each other as compared to the case without the recessed groove 28a formed in the surface of the pin receiving portion 3. Also, the stroke distance $b_1$ required for engagement between the pin 6 and the pin receiving portion 3 can be reduced.

Also, in the above described embodiment, the case has been described where the upper rim 1 includes the pin receiving portion 3 and the stand receiving portion 4, and the lower rim 2 includes the pin 6 and the stand 7, but the present invention is not limited to this example. For example, the upper rim 1 may include a pin 6 or a stand 7, and the lower rim 2 may include a pin receiving portion 3 or a stand receiving portion 4. Further, in the above described embodiment, the case has been described where the pin receiving portion 3 protrudes from the upper rim 1 toward the lower rim 2, but the present invention is not limited to this example. For example, the pin receiving portion 3 may be embedded in a body of the upper rim 1 (the lower rim 2 when the lower rim 2 includes the pin receiving portion 3). Specifically, a surface of the upper rim 1 facing the lower rim 2 may be flat, and the pin receiving portion 3 may be formed in the flat surface on an inner side of the upper rim 1.

Further, in the above described embodiment, the case has been described where the recessed groove 28a is formed in both the first region 3A and the second region 3B of the pin receiving portion 3, but the present invention is not limited to this example. For example, no recessed groove 28a may be formed in the first region 3A of the pin receiving portion 3, and the recessed groove 28a may be formed in the second region 3B. When the tire 60 is mounted to the upper rim 1 and the lower rim 2 and tested, the pin 6 faces the second region 3B of the pin receiving portion 3. This allows the upper rim 1 and the lower rim 2 to be brought closer to each other during the test. Also, in the above described embodiment, the first region 3A and the second region 3B of the pin receiving portion 3 are a continuous integral member, but the first region 3A and the second region 3B may be formed of separate members.

REFERENCE SIGNS LIST 1 upper rim (second rim)
2 lower rim (first rim)
3, 40 pin receiving portion
4 stand receiving portion
5 gripped portion
6 pin
7 stand
8 support
9 chuck mechanism
11 rim stocker
12 tire uniformity measurement machine
13 upper rim shaft 14 rim elevator (hanging unit)
15 pedestal
16 lower spindle
17 swivel shaft
18 stocker frame
19 rim pedestal
20 swivel
21, 23 rail
22 load wheel
24 frame
25 ball screw
26, 41 insertion opening
27, 43 sliding opening
28, 42 support
28a recessed groove (groove)
29, 44 sliding groove
30, 50 protrusion
31 positioning projection
32 positioning hole
60 tire

The invention claimed is:

1. A rim assembly having a pair of a first rim and a second rim to which a tire to be tested is mounted, comprising:
   a pin provided on the first rim;
   a pin receiving portion provided on the second rim and engageable with the pin; and
   a groove portion formed in a surface on a first rim side of the second rim and having a groove that houses at least a part of a tip of the pin when a tire having a small bead width is mounted between the first rim and the second rim, the groove having a recessed shape in a sectional view.

2. The rim assembly according to claim 1, wherein the tip of the pin has a protrusion extending perpendicularly to an axial direction of the pin, and
   the pin receiving portion has a sliding groove in which the protrusion of the pin slides, and a sliding opening in which the pin slides.

3. The rim assembly according to claim 2, wherein an upper surface of the protrusion and a part of the groove facing the protrusion when housing the part of the protrusion each have a tapered shape.

4. The rim assembly according to claim 1, wherein the pin receiving portion and the groove portion are formed in a circumferential direction of the second rim, and the groove is also formed in the circumferential direction.

5. The rim assembly according to claim 1, wherein the pin receiving portion and the groove portion are formed in the same section, and the groove of the groove portion is provided on a first rim side of the pin receiving portion.

6. The rim assembly according to claim 1, further comprising a stand provided on at least one of the first rim and the second rim,
   wherein the stand is for supporting the first rim or the second rim located thereabove at the time when the pin is engaged with the pin receiving portion.

7. A tire testing machine comprising:
   a rim assembly according to claim 1; and
   a hanging unit that supports the first rim or the second rim to hang the rim assembly.

8. A rim assembly replacement method of a tire testing machine using a rim assembly having a pair of a first rim and a second rim to which a tire to be tested is mounted, the method comprising
   a step of supporting the first rim or the second rim to hang the rim assembly, the rim assembly including the following elements: a pin provided on the first rim; a pin receiving portion provided on the second rim and engageable with the pin; and a groove portion formed in a surface on a first rim side of the second rim and having a groove that can house at least a part of a tip of the pin, the groove having a recessed shape in a sectional view.

* * * * *